US008326894B2

(12) United States Patent
Qi

(10) Patent No.: US 8,326,894 B2
(45) Date of Patent: Dec. 4, 2012

(54) METHOD AND SYSTEM TO SPACE-EFFICIENTLY TRACK MEMORY ACCESS OF OBJECT-ORIENTED LANGUAGE IN PRESENCE OF GARBAGE COLLECTION

(75) Inventor: Yao Qi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/610,111

(22) Filed: Oct. 30, 2009

(65) Prior Publication Data

US 2010/0114999 A1    May 6, 2010

(30) Foreign Application Priority Data

Oct. 31, 2008 (CN) .......................... 2008 1 0174632

(51) Int. Cl.
*G06F 12/00* (2006.01)
*G06F 17/30* (2006.01)

(52) U.S. Cl. ........................................ 707/813; 707/816

(58) Field of Classification Search ........................ None
See application file for complete search history.

(56) References Cited

U.S. PATENT DOCUMENTS

| | | | |
|---|---|---|---|
| 5,535,329 | A | 7/1996 | Hastings |
| 6,192,517 | B1 | 2/2001 | Agesen et al. |
| 6,799,191 | B2* | 9/2004 | Agesen et al. ......................... 1/1 |
| 7,519,640 | B1* | 4/2009 | Garthwaite ........................... 1/1 |
| 7,882,159 | B2* | 2/2011 | Beard ........................... 707/814 |
| 2001/0044856 | A1* | 11/2001 | Agesen et al. ................. 709/315 |
| 2002/0165994 | A1* | 11/2002 | Chappell ....................... 709/315 |
| 2004/0078540 | A1* | 4/2004 | Cirne et al. ................... 711/170 |
| 2004/0158589 | A1* | 8/2004 | Liang et al. .................... 707/206 |
| 2005/0204342 | A1* | 9/2005 | Broussard ..................... 717/124 |
| 2007/0226282 | A1* | 9/2007 | Kwon ........................... 707/206 |
| 2010/0083004 | A1* | 4/2010 | Kirshenbaum ............... 713/193 |

OTHER PUBLICATIONS

Caplinger, "A Memory Allocator with Garbage Collection for C", Feb. 9, 1988, USENIX Association Winter Conference, p. 325-330.

* cited by examiner

*Primary Examiner* — Khanh Pham
*Assistant Examiner* — Azam Cheema
(74) *Attorney, Agent, or Firm* — Steven E. Bach

(57) ABSTRACT

The present invention provides a method and system for processing memory access events. The method comprises: executing an extended program including instrumented memory tracking code for tracking memory access events of a plurality of objects; allocating a unique identifier for each of the plurality of tracked objects; creating a weak reference for each of the plurality of tracked objects, wherein a mapping relationship is established between the identifier of the weak reference and that of the corresponding tracked object; recording and storing the memory access events of the plurality of tracked objects; in response to receiving a notification of memory garbage collection which includes an identifier of a weak reference of a collected object, determining the identifier of the collected object based on the mapping relationship between the identifier of the weak reference and that of the corresponding tracked object, and searching the stored memory access events for the memory access events of the collected object; and deleting the memory access events of the collected object. The storage overhead may be reduced according to the above method of the present invention.

19 Claims, 2 Drawing Sheets

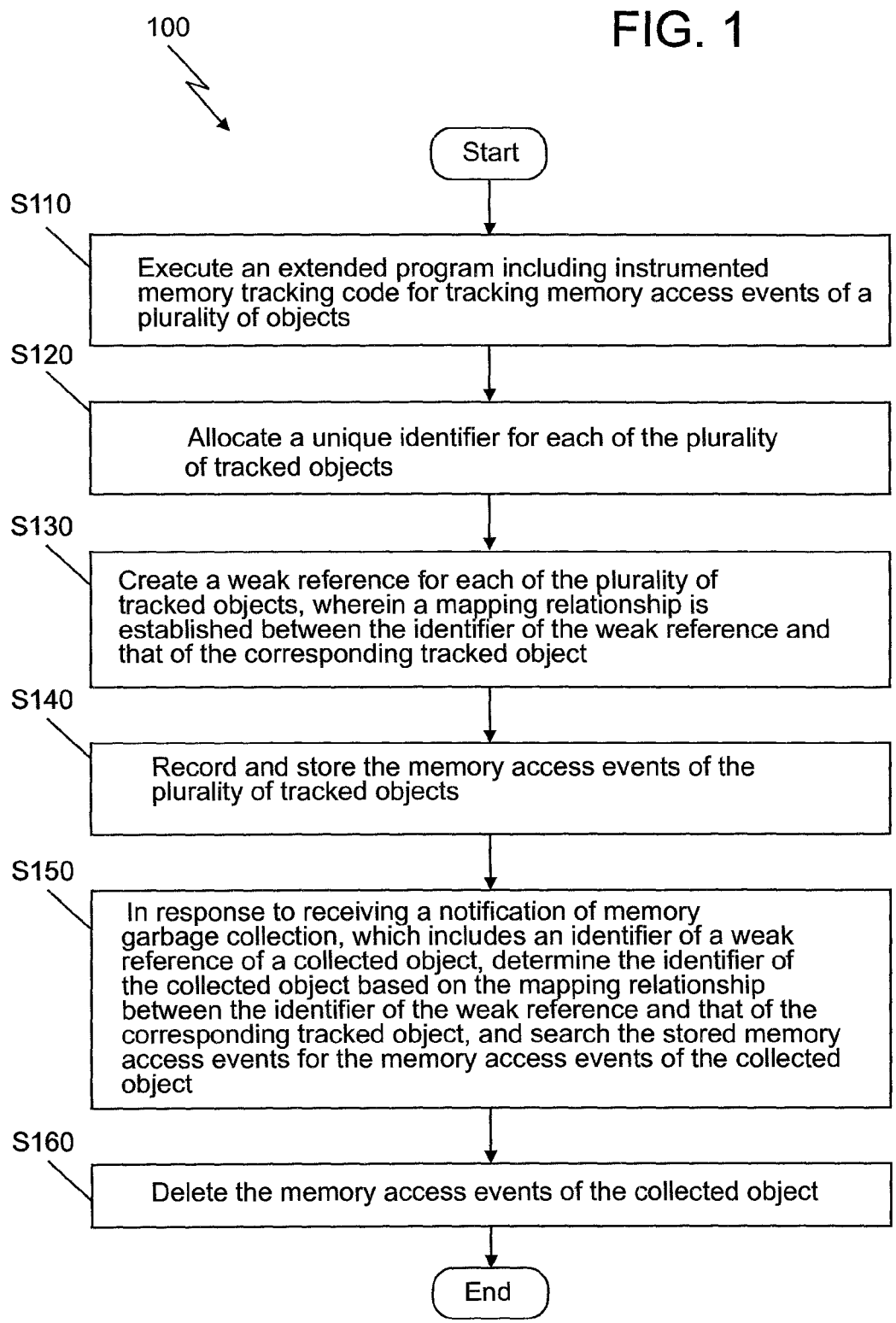

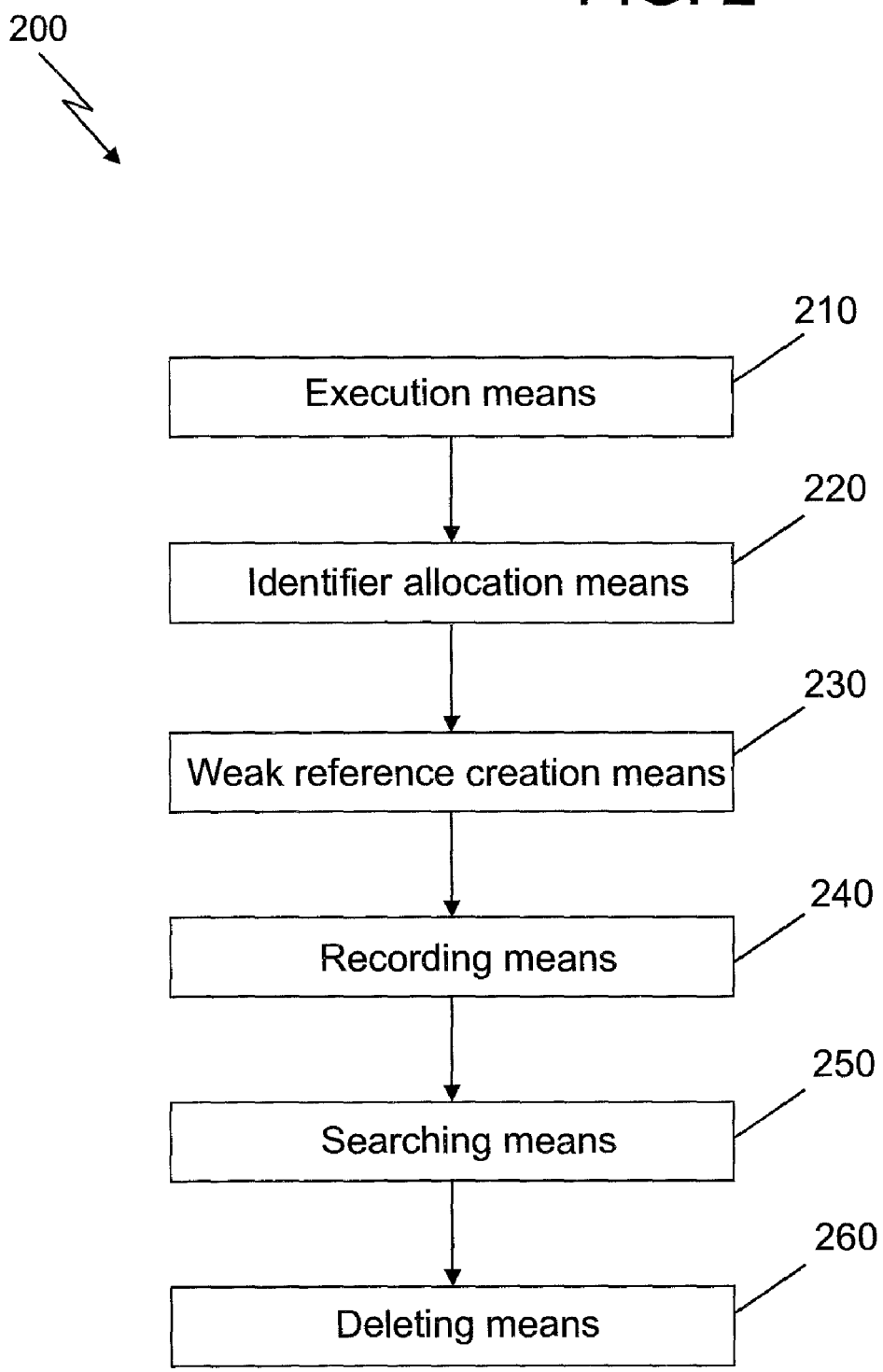

METHOD AND SYSTEM TO SPACE-EFFICIENTLY TRACK MEMORY ACCESS OF OBJECT-ORIENTED LANGUAGE IN PRESENCE OF GARBAGE COLLECTION

TECHNICAL FIELD OF THE INVENTION

The invention relates to data processing in a computing system, and particularly to a method and system for processing memory access events.

BACKGROUND OF THE INVENTION

For the past two decades and longer, due to the rapid development of microelectronic technology, the performance and capacity of computer systems has increased explosively. More computing resources mean that it is possible to develop more complex software to deal with complex problems. Furthermore, more computing resources also mean that it is possible to perform more operations in parallel. Thus, parallel architectures and parallel software development has begun to play a key role in information processing. However, the software (such as software containing a plurality of threads) for dealing with complex problems has become more complex itself.

A process is a program or part of a program running on a computer system, or an associated sequence of steps performed by a certain program. Each process includes one or more threads. A thread is a set of instructions, or a specific section of a program, which can execute independently in the program. Thus a thread is basically a lightweight process, which is responsible for performing tasks in a single program. Usually the operating system is responsible for scheduling and executing a plurality of threads. Each thread can include a plurality of objects that cooperate with one another.

An object-oriented program organizes a plurality of objects that cooperate with one another. In conventional techniques, a program can generally be considered as a sequence of instruction sets. In an object-oriented program, each object can receive messages, process data, and send messages to other objects. In an object-oriented program, memory accesses can be considered as accesses to some fields of objects.

An object-oriented program, especially a multi-thread program for parallel processing, may problems in design due to the software complexity. For example, multi-thread processing is often employed in a process or program, to fully utilize system resources, reduce response time of the program, and improve use experiences. Multi-thread software enables the multiple threads to operate in parallel to perform a plurality of tasks, in order to improve the system efficiency. A thread is implemented when it is needed to perform a plurality of tasks at the same time. However, when a program utilizes multiple threads, it becomes necessary to seriously take threads scheduling into account. If scheduled inappropriately, either the program produce an error, or an absurd result is caused. For example, such software may produce the problem of data race or memory leakage when running. One of the approaches to solve such problems is to conduct memory access tracking and process memory access events to find out and solve problems.

Memory access tracking is usually employed in memory leakage analysis, memory overflow analysis, or data race analysis. When two threads access to the same memory address or overlapped memory addresses simultaneously in which at least one of the accesses includes a write operation, if there is no forced constraint on the access order, a data race will occur. In order to detect a data race, information of each memory access location will be recorded, along with the associated access event.

In prior art, accesses to the memory by a program are tracked by instrumented code. The instrumented code generally comprises extra descriptions and instructions. When the tracked program runs, these extra descriptions and instructions run along with the tracked program. These extra descriptions and instructions will invoke a memory access tracking routine to record memory access events.

The principal problem of memory tracking is the memory overhead, as the memory tracking tool will record all information related to memory accesses. Each memory access event is stored into the memory. Hence, for an actual program, such as an object-oriented application, billions of memory access events will be produced during runtime. To record all of those memory access events will occupy a large amount of processing resources and storage space.

For an object-oriented program, when allocating the memory space, a group of object references are initially set to constitute a root, from which all other objects in the program can be referenced. These root object references are composed of all static field references. The central processing unit (CPU) registers the referenced objects, variables stored on the thread stacks, and internal object references maintained during runtime. The memory space occupied by those objects that cannot be accessed from the root is subject to garbage collection.

Garbage collection (GC), also referred to as memory garbage collection, is a common way of automatic memory management. A garbage collector attempts to collect the memory space used by objects, which may not be used by the objects any more. For example, if the program will not access or process an object any more, the memory space allocated to this object is subject to garbage collection.

As mentioned above, the memory space comprises the memory space occupied by the root objects, the memory space occupied by other objects referenced by the root objects, the memory space occupied by the objects referenced by said other objects, and the memory space not occupied by any of the above objects. Such memory space not occupied by any of the above objects will be collected as garbage. After the garbage collection, most garbage collectors will compact the heap. In other words, the garbage collectors may move living objects to new locations in the heap, and the location of a living object can be changed several times during its lifecycle. For example, a heap comprises a plurality of objects for which memory space has been allocated, wherein the root of the application directly references objects A and E. When the object E is added, if it references an object C, the object C is also referenced and allocated memory space. The garbage collectors will query all accessible objects repeatedly.

A garbage collector moves non-garbage objects in the memory, eliminates redundant gaps in the heap, moves objects in the memory, and invalidates the pointers to the objects.

There are some kinds of common garbage collection technologies. A Mark-Sweep mechanism checks whether an object can be accessed directly or indirectly externally. Inaccessible objects will be identified. It is difficult for a Mark-Sweep garbage collector to deal with fragments. At this point, fragments are usually dealt with using a copy and compact technology.

A collector of a Mark-Sweep-Compact (MSC) mechanism compacts data during each data gathering. Thus, it can prevent fragment generation and maintain the order of allocated objects. A collector of the MSC mechanism can provide better processing capability, and this technology has a higher utilization ratio of memory space. The technology is efficient only under the circumstance of less memory requirement, but with poor extendibility.

There are also Generational collectors, which divide the memory into several regions. This technology manages objects in the memory on an age basis. Two regeneration collectors divide the memory into two regions. One is a region for allocating memory, called a nursery region; the other is a region for storing old objects, called an old generation region. When the memory space in the nursery region is entirely occupied, nursery collection is performed to copy accessible objects in the nursery region to the old generation region. When the memory space in the old generation region is entirely occupied, garbage collection is performed to garbage collect all the objects in the old generation region. The regeneration collection is based on an assumption that the lifecycles of most objects are very short, and only the lifecycles of a small portion of objects are longer. The processing capability of a regeneration collector is better, and the system latency is shorter. The technology for memory garbage collection used in the old generation determines the requirement level of memory space and the characteristics of system latency.

SUMMARY OF THE INVENTION

In view of the shortcomings of the prior art, the present invention provides a novel method for processing memory access events, comprising: executing an extended program including instrumented memory tracking code for tracking memory access events of a plurality of objects; allocating a unique identifier for each of the plurality of tracked objects; creating a weak reference (wr) for each of the plurality of tracked objects, wherein a mapping relationship is established between the identifier of the weak reference and that of the corresponding tracked object; recording and storing the memory access events of the plurality of tracked objects; in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and deleting the memory access events of the collected object.

The present invention also provides a system for processing memory access events, comprising: execution means for executing an extended program including instrumented memory tracking code for tracking memory access events of a plurality of objects; identifier allocation means for allocating a unique identifier for each of the plurality of tracked objects; weak reference creation means for creating a weak reference (wr) for each of the plurality of tracked objects, wherein a mapping relationship is established between the identifier of the weak reference and that of the corresponding tracked object; recording means for recording and storing the memory access events of the plurality of tracked objects; searching means for, in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and deleting means for deleting the memory access events of the collected object.

The storage overhead may be reduced according to the above method and system of the present invention. In particular, the memory overhead may be reduced when memory access events are stored directly in the memory.

BRIEF DESCRIPTION OF THE DRAWINGS

FIG. 1 illustrates a flowchart for processing memory access events according to an embodiment of the present invention.

FIG. 2 illustrates a block diagram of a system for processing memory access events according to another embodiment of the present invention.

DETAILED DESCRIPTION OF EMBODIMENTS

The present invention is described below with reference to a method and apparatus according to embodiments thereof. Each block in the flow chart and/or block diagram and combinations of blocks in the flow chart and/or block diagram may be implemented by computer program instructions. These computer program instructions may be provided to a processor of a general purpose computer, special purpose computer, or other programmable data processing device to produce a machine, such that these instructions executed via the computer or other programmable data processing device create means for implementing the functions/operations specified in the blocks of the flow chart and/or block diagram.

These computer program instructions may also be stored in computer readable medium that can direct a computer or other programmable data processing device to function in a particular manner, such that the instructions stored in the computer readable medium produce an article of manufacture including instruction means which implement the functions/operations specified in the blocks of the flow chart and/or block diagram.

These computer program instructions may also be loaded into a computer or other programmable data processing device to cause a series of operational steps to be performed on the computer or other programmable data processing device to produce a computer-implemented process, such that the instructions which are executed in the computer or other programmable device provide the process for implementing the functions/operations specified in the blocks of the flow chart and/or block diagram.

FIG. 1 illustrates a flowchart according to an embodiment of the present invention. In FIG. 1, there is shown a method 100 for processing memory access events. The method 100 starts to perform an extended program including instrumented memory tracking code for tracking memory access events of a plurality of objects at Step S110.

For example, for a program A includes a plurality of objects. An object code extension program can be employed to instrument memory tracking code, in order to track memory access events of the objects in the program A. For example, the object code extension program inserts new instructions and data among the original instructions and data of the object code files of the program A; and modifies the original offsets accordingly to reflect the new location relationships between the original instructions and data. The added instructions can be used to establish and maintain a memory status array in order to perform memory access tracking. The memory status array comprises multiple storage location entries accessed by the objects; the storage location entries indicate the statuses of the corresponding memory locations.

The method of the present invention can be used for, but is not limited to, object-oriented programs. An object-oriented program organizes a plurality of objects that cooperate with one another. In conventional techniques, a program can be generally considered as a sequence of instruction. In an object-oriented program, each object can receive messages, process data, and send messages to other objects. A memory access event of an object is a read or a write event on the memory allocated to the object. For example, if an object "a" writes data into an object "b", then a read event of the object "a" and a write event of the object "b" can be recorded. In an object-oriented program, a memory access event of an object can be considered as an event of access to one or more fields of the object.

According to an embodiment of the present invention, a memory access event includes: 1) a unique identifier of the object, 2) a name of a field of the object, 3) an operation type, such as a write operation, and 4) a thread identifier. For the unique identifier of the object, in the extended program, the present invention employs a globally unique identifier.

For example,

```
Class foo
{
    int i;
}
Class foo f = new foo( );
f.i = 1;
``` wherein, "f.i=1" is a memory write operation, for which a memory access event is generated. The memory access event comprises: 1) a unique identifier "f" of the object, 2) a name of the field "i" of the object, 3) an operation type as a write operation, and 4) a thread identifier "T" of the current thread.

At Step S120, a unique identifier is allocated for each of the plurality of tracked objects. At Step S130, a weak reference (wr) is established for each of the plurality of tracked objects, wherein a mapping relationship is established between the identifier of the weak reference and that of the corresponding tracked object. According to another embodiment of the present invention, the identifier of the weak reference and that of the corresponding tracked object are identical.

It can be appreciated by a person skilled in the art that there is no strict limitation on the order of Step S120 and Step S130, as long as a mapping relationship is established between the identifier of the tracked object and that of the weak reference of the object, such as, they being set to a same unique identifier.

It is possible to firstly allocate a unique identifier for each of the plurality of tracked objects respectively; then establish a weak reference (wr) for each of the plurality of tracked objects, and set the identifier of the weak reference as that of the corresponding tracked object.

It is also possible to firstly establish a weak reference (wr) for each of the plurality of tracked objects, wherein the identifier of the weak reference is set to a unique identifier; then allocate the unique identifier to the corresponding tracked object.

At Step S140, the memory access events of the plurality of tracked objects are recorded and stored. It is possible to record and store all the memory access events of the plurality of objects in order to analyze the memory access events. The storage of memory access events can use various methods, for example, they can be stored with a common hash image method, in which the key is the object identifier, and the value is a list of memory access events, such as a detailed memory access procedure. For a given object identifier, it is possible to query the memory access events related to the object. To perform a real-time analysis, the memory access events can be stored in the memory. It is appreciated by a person skilled in the art that it is also possible to store the memory access events in other storage regions as needed.

At Step S150, in response to receiving a notification of memory garbage collection, which includes an identifier of a weak reference of a collected object, the identifier of the collected object is determined based on the mapping relationship between the identifier of the weak reference and that of the corresponding tracked object, and the stored memory access events are further searched for the memory access events of the collected object based on the identifier of the collected object. It can be seen from the above description of Steps S120 and 130 that the present invention has established a mapping relationship between the identifier of the tracked object and that of the weak reference of the object, such as, setting them to a same unique identifier. In this way, the identifier of the tracked object can be obtained based on the identifier of the weak reference in the notification of garbage collection. Thus, the stored memory access events can be searched for the memory access events of the collected object based on the identifier.

While the program is running, an object therein can be referenced by multiple weak references and multiple strong references at the same time. Only when an object is not referenced by any strong reference, it is allowed to be garbage collected. Before being extended, a reference to an object in the original program by another object is a strong reference. After being extended, other objects in the program access to the tracked object using strong references. Strong references are the most common references. If an object is strong referenced, it recognized as a necessity, so that the garbage collector will never collect this object. For example, when a java virtual machine throws an OutOfmemoryError, it will not freely collect any object with a strong reference.

According to a predetermined policy, garbage collection (i.e. GC) can be performed on the memory space occupied by objects. The garbage collection attempts to collect the memory space used by some objects, which memory space may not need to be used by the objects any more. For example, if a program will not access to an object any more, the memory space allocated to this object is subject to garbage collection. For example, when the garbage collector detects objects with only a weak reference, it will collect them directly, regardless of whether or not the remaining memory space is sufficient.

At Step S160, the memory access events of the collected object are deleted. After the garbage collection of an object, the runtime environment will notify the identifier of the weak reference of the garbage collected object, for example, sending the notification to a reference tracking program. A mapping relationship has been established between the identifier of the weak reference and that of the corresponding tracked object, such as, in one embodiment, the identifier of the weak reference and the object identifier being set to the same. Thus, it is possible to query the stored memory access events using the identifier, such as querying the memory access events in the hash image. Then, as needed, analysis is performed on the memory access events. In this way, the object is garbage collected, and no memory access event of the object will be produced. Therefore, the memory access events can be deleted after the analysis. It can be appreciated by a person skilled in the art that the memory access events can be deleted directly according to practical requirements, without needing any further analysis.

According to another embodiment of the present invention, the method for processing memory access events may further comprise: for a tracked object, binding the weak reference of the object with a reference queue. In response to the garbage collection of the object, the weak reference of the object is put into the reference queue. The identifier of the weak reference of the object is read out from the reference queue, and included in the notification of garbage collection. Thereafter, the identifier of the weak reference can be deleted from the reference queue.

According to another embodiment of the present invention, before deleting the memory access events of the collected object, the method can also comprise: analyzing the memory access events of the collected object in real time. Analyzing the memory access events of the collected object in real time is further configured to, in response to receiving a notification of memory garbage collection, the memory access events of the garbage collected object are analyzed while the program is running. When an object is not used by the program any more, the garbage collector performs garbage collection on the object. At this time, no memory access event of the object will occur. Under such a circumstance, the memory access events of the object can be analyzed thoroughly.

In this way, while the program keeps running, the searched out memory access events of the garbage collected object can be analyzed. The analysis includes one or more of such analysis methods as: data race analysis, memory leakage analysis, or memory overflow analysis. After the analysis is completed, it is not necessary to keep the memory access events of the object in the memory. The memory access events of the object can be deleted from the memory, or dumped into other storage media, such as a hard disk.

In one embodiment, analyzing the memory access events of the collected object in real time can be further configured to analyze the memory access events in real time in response to recording and storing the memory access events of the plurality of tracked objects.

Real-time analysis refers to either performing analysis when a program is running, or performing a collection process and an analysis process simultaneously, i.e., gathering the memory access events of the plurality of objects at the same time as analyzing them. In the latter case, the memory access events of the gathered objects are analyzed in time, without having to waiting for the objects being garbage collected to perform the analysis. In this way, after the object is garbage collected, if there is no need to perform further analysis, the memory access events of the object are deleted directly.

The analysis of the memory access events of an object, such as the checking at runtime, may include, but is not limited to, one or more of such analysis methods as: data race analysis, memory leakage analysis, or memory overflow analysis. For example, the data race analysis can be performed with the following method. Firstly, based on a unique identifier of an object E, a list L of its memory access events can be queried. Then, analysis is performed on the memory access events in the list. For example, for a memory access event EE in the list L, it is iteratively analyzed whether there is a data race between it and other memory access events of the object. For example, if (EE.objectId=E.objectId & EE.fieldName=E.fieldName & EE.threadId=E.threadId & (EE.type=WRITE|E.type=WRITE)) then, EE and E will generate a data race. This section of the method for detecting data race indicates that if two threads, one of which includes a write operation, access to the same memory address simultaneously, if there is no forced constraint on the access order (such as, using an mutex lock to control the access order), a data race will occur. At this point, different results will occur according to different access orders.

Through the memory access events of the analyzed object, it is possible to detect data races occurring during the execution of a multi-thread process. A data race will occur in the following circumstance: two or more threads in a program (i.e. a single process) access the same memory location, at least one access is for writing, and the threads have not used any mutex lock to control the access to the memory. When these three conditions are met, the access order is indefinite, so that results provided during different runs may vary according to the order. Some data races may be innocuous (such as when the memory access is for busy waiting). An innocuous data race refers to an intended data race whose existence will not influence the correctness of the program. Some multi-thread application programs may intentionally use code that may result in a data race. As the data race therein is caused by design, there is no need to fix it. Many data races, however, are errors in a program.

According to another embodiment of the present invention, an object therein can be referenced by multiple weak references and multiple strong references simultaneously. Only when an object is not referenced by any strong reference, it is allowed to be garbage collected. Further, other objects have access to the tracked object using strong references.

The storage overhead may be reduced according to the above method of the present invention. In particular, the memory overhead may be reduced when memory access events are stored directly in the memory for real-time analysis.

For a program extended for memory tracking, the memory space occupied by the program before and after the processing of memory access events according to an embodiment of the present invention is shown in the following table. When memory access events are stored directly in the memory for real-time analysis, the memory overhead is reduced significantly according to the embodiment of the present invention.

| Program Name | Before Processing | After Processing |
| --- | --- | --- |
| Derby 10.4 | 18.4M | 6.7M |
| Tomcat 6.0.13 | Out of Memory (512M memory space is pre-allocated) | 231M |
| WAS 6.1 with Plants | Out of Memory (512M memory space is pre-allocated) | 488M |

FIG. 2 illustrates a block diagram of a system for processing memory access events according to another embodiment of the present invention. As shown in FIG. 2, the present invention also provides a system 200 for processing memory access events. The system 200 corresponds to the method 100 for processing memory access events as above mentioned, and comprises the following multiple means. Execution means 210 is for executing an extended program including instrumented memory tracking code for tracking memory access events of a plurality of objects. Identifier allocation means 220 is for allocating a unique identifier to each of the plurality of tracked objects. Weak reference creation means 230 is for creating a weak reference (wr) for each of the plurality of tracked objects, wherein a mapping relationship is established between the identifier of the weak reference and that of the corresponding tracked object. Recording means 240 is for recording and storing memory access events of the plurality of tracked objects. Searching means 250 is for, in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object. Deleting means 260 is for deleting the memory access events of the collected object.

The multiple means of the system 200 may comprise program instructions stored on a memory and executed by a processor.

The system may further comprise weak reference identifier processing means configured to bind the weak reference of a tracked object with a reference queue; when the object is garbage collected, put the weak reference of the object into the reference queue; and read out the identifier of the weak reference of the object from the reference queue, and include it in the notification of garbage collection.

The weak reference identifier processing means may be further configured to delete the identifier of the weak reference from the reference queue after reading out the identifier of the weak reference of the object from the reference queue.

Other objects have access to the tracked object using strong references.

The above system may further comprise analyzing means for analyzing the memory access events of the collected object in real time. The analyzing means may be further configured to analyze the memory access events of the garbage collected object while the program is running, in response to receiving a notification of memory garbage collection. The analyzing means may be further configured to analyze the memory access events of the plurality of objects in real time in response to recording and storing the memory access events of the plurality of tracked objects.

Analyzing the memory access events of the collected object may include performing data race analysis, memory leakage analysis, or memory overflow analysis.

Alternatively, the identifier of the weak reference and that of the corresponding tracked object may be identical; and the program may be an object-oriented program. The present invention also provides a storage medium, on which instructions for performing the method according to the present invention are encoded.

The flowchart and block diagram in the accompanying figures illustrate the architecture, functionality, and operations of possible implementations of the system, method and computer program product according to embodiments of the present invention. In this regard, each block in the flow chart or block diagram may represent a module, program section, or portion of code, which comprises one or more executable instructions for implementing the specified logical functions. It should also be noted that, in some alternative implementations, the functions noted in the blocks may occur in an order different from that in the figures. For example, two blocks shown in succession may, in fact, be executed basically concurrently, or the blocks may sometimes be executed in the reverse order, depending upon the functionality involved. It will also be noted that each block of the block diagram and/or flow chart, and combinations of blocks in the block diagram and/or flow chart, can be implemented by special purpose hardware-based systems for performing the specified functions or operations, or by a combinations of special purpose hardware and computer instructions.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or a combination of software and hardware aspects which are generally referred to herein as a "circuit," "module" or "system". Furthermore, the present invention may take the form of a computer program product embodied on any tangible medium of expression having computer-usable program code embodied therein.

Any combination of one or more computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport a program for use by or in connection with the instruction execution system, apparatus, or device.

The computer program code for carrying out operations of the present invention may be written in any combination of one or more programming languages including Java, Smalltalk, C++ or the like, also including conventional procedural programming languages, such as the "C" programming language or similar programming languages. The program code may execute entirely on the user's computer, partly on the user's computer, as a stand-alone software package, partly on the user's computer and partly on a remote computer or entirely on a remote computer or server. In the latter scenario, the remote computer may be connected to the user's computer through any kind of network including a local area network (LAN) or a wide area network (WAN), or the connection may be made to an external computer (for example, through the Internet via an Internet Service Provider).

The present invention has been described above in detail in conjunction with preferred embodiment. However, it is obvious that the above embodiments are only illustrative, not limiting the present invention. Modifications can be made to the illustrated embodiments of the present invention by one skilled in the art, without departing from the scope and spirit of the present invention.

The invention claimed is:

1. A computer-implemented method for processing memory access events, comprising:
   executing an extended program including instrumented memory tracking code for tracking memory access events of a plurality of objects;
   allocating a unique identifier for each of the plurality of tracked objects;
   creating a weak reference for each of the plurality of tracked objects, wherein a mapping relationship is established between the identifier of the weak reference and that of the corresponding tracked object;
   binding the weak reference of the object with a reference queue:
   recording and storing the memory access events of the plurality of tracked objects;
   in response to the object being garbage collected, putting the weak reference of the object into the reference queue: and reading-out the identifier of the weak reference of the object from the reference queue, and including it in a notification of garbage collection:
   in response to receiving the notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and deleting the memory access events of the collected object.

2. The method according to claim 1, further comprising: deleting the identifier of the weak reference from the reference queue.

3. The method according to claim 1, wherein other objects have access to the tracked object by using strong references.

4. The method according to claim 1, wherein before deleting the memory access events of the collected object, the method further comprises:

analyzing the memory access events of the collected object in real time.

5. The method according to claim 4, wherein analyzing the memory access events of the collected object in real time is further configured to: in response to receiving a notification of memory garbage collection, analyze the memory access events of the garbage collected object while the program is running.

6. The method according to claim 4, wherein analyzing the memory access events of the collected object in real time is further configured to: in response to recording and storing the memory access events of the plurality Of tracked objects, analyzing the memory access events of the plurality of objects in real time.

7. The method according to claim 4, wherein analyzing the memory access events of the collected object includes performing data race analysis, memory leakage analysis, or memory overflow analysis.

8. The method according to claim 1, wherein the identifier of the weak reference and that of the corresponding tracked object are identical, and the program is an object-oriented program.

9. A computer-implemented method for processing memory access events, comprising:

executing an extended program including instrumented memory tracking code for tracking memory access events of a plurality of objects;

allocating a unique identifier for each of the plurality of tracked objects;

creating a weak reference for each of the plurality of tracked objects, wherein a mapping relationship is established between the identifier of the weak reference and that of the corresponding tracked object;

recording and storing the memory access events of the plurality of tracked objects;

in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and deleting the memory access events of the collected object;

wherein the collected object can be referenced by multiple weak references and multiple strong references simultaneously and only when the collected object is not referenced by any strong reference allowing it to be garbage collected.

10. A system for processing memory access events, comprising:

execution means for executing an extended program including instrumented memory tracking code for tracking memory access events of a plurality of objects;

identifier allocation means for allocating a unique identifier for each of the plurality of tracked objects;

weak reference creation means for creating a weak reference for each of the plurality of tracked objects, wherein a mapping relationship is established between the identifier of the weak reference and that of the corresponding tracked object;

weak reference identifier processing means configured to for a tracked object. binding the weak reference of the object with a reference queue: when the object is garbage collected, putting the weak reference of the object into the reference queue: and reading out the identifier of the weak reference of the object from the reference queue and including it in the notification of garbage collection:

recording means for recording and storing the memory access events of the plurality of tracked objects;

searching means for, in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and deleting means for deleting the memory access events of the collected object.

11. The system according to claim 10, wherein the weak reference identifier processing, means is further configured to after reading out the identifier of the weak reference of the object from the reference queue, deleting the identifier of the weak reference from the reference queue.

12. The system according to claim 10, wherein other objects have access to the tracked object using strong references.

13. The system according to claim 10, further comprising analysis means for analyzing the memory access events of the collected object in real time.

14. The system according to claim 13, wherein the analysis means is further configured to, in response to receiving a notification of memory garbage collection, analyze the memory access events of the garbage collected object while the program is running.

15. The system according to claim 13, wherein the analysis means is further configured to, in response to recording and storing the memory access events of the plurality of tracked objects, analyze the memory access events of the plurality of objects in real time.

16. The system according to claim 13, wherein analyzing the memory access events of the collected object includes performing data race analysis, memory leakage analysis, or memory overflow analysis.

17. The system according to claim 10, wherein the identifier of the weak reference and that of the corresponding tracked object are identical, and the program is an object-oriented program.

18. A system for processing memory access events. comprising:

execution means for executing an extended program including instrumented memory tracking code for tracking memory access events of a plurality of objects;

identifier allocation means for allocating a unique identifier for each of the plurality of tracked objects:

weak reference creation means for creating a weak reference for each of the plurality of tracked objects, wherein a mapping relationship is established between the identifier of the weak reference and that of the corresponding tracked object:

recording means for recording and storing the memory access events of the plurality of tracked objects;

searching means for, in response to receiving a notification of memory garbage collection, which includes an identifier of a weak reference of a collected object, determining the identifier of the collected object based on the mapping relationship between the identifier of the weak reference and that of the corresponding tracked object. and searching the stored memory access events for the memory access events of the collected object: and deleting means for deleting the memory access events of the collected object;

wherein the collected object can be referenced by multiple weak references and multiple strong references simultaneously, and only when the collected object is not referenced by any strong reference, allowing it to be garbage collected.

19. A computer program product comprising a computer-readable storage device having encoded thereon:

computer-readable program instructions for executing an extended program including instrumented memory, tracking code for tracking memory access events of a plurality of objects; computer-readable program instructions for allocating a unique identifier for each of the plurality of tracked objects;

computer-readable program instructions for creating a weak reference for each of the plurality of tracked objects, wherein a mapping relationship is established between the identifier of the weak reference and that of the corresponding tracked object;

computer-readable program instructions for binding the weak reference of the object with a reference queue:

computer-readable program instructions for recording and storing the memory access events of the plurality of tracked objects;

computer-readable program instructions-for putting, the weak reference of the object into the reference queue in response to the object being garbage collected, and reading out the identifier of the weak reference of the object from the reference queue, and including it in a notification of garbage collection:

computer-readable program instructions for, in response to receiving a notification of memory garbage collection, which includes an identifier of a weak reference of a collected object, determining the identifier of the collected object based on the mapping relationship between the identifier of the weak reference and that of the corresponding tracked object, and searching the stored memory access events for the memory access events of the collected object; and computer-readable program instructions for deleting the memory access events of the collected object.

* * * * *